Dec. 27, 1960 G. H. MOREY 2,966,648
ELECTRIC HEATING ELEMENT
Filed Aug. 26, 1958
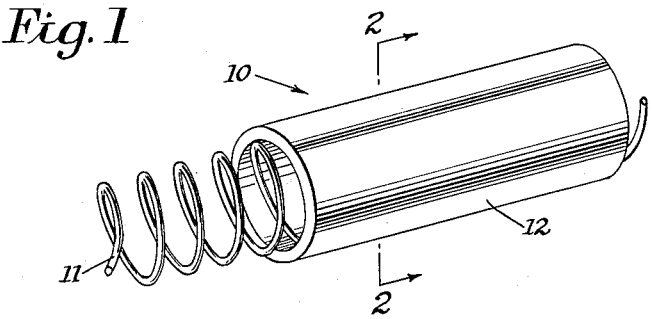
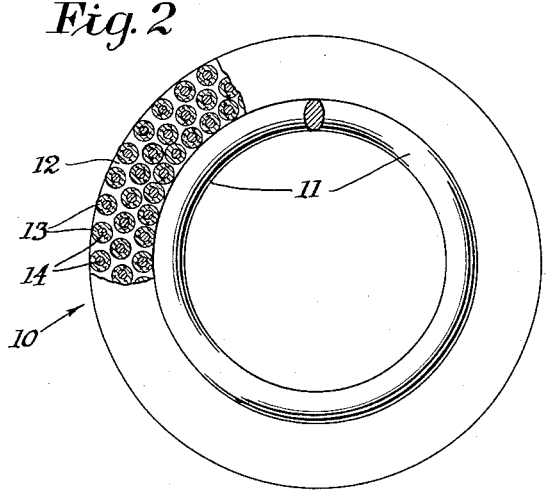
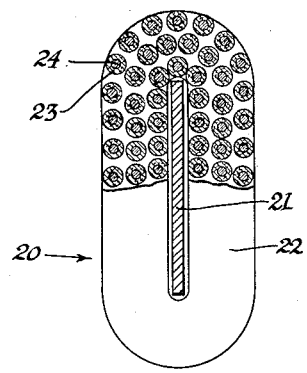
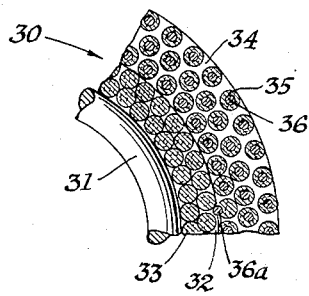
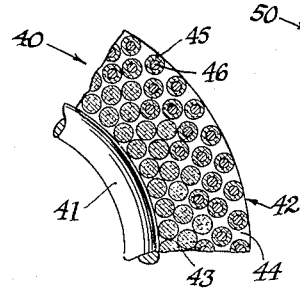
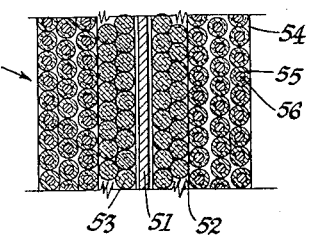
INVENTOR
GLEN H. MOREY
BY Toulmin & Toulmin
ATTORNEYS 2,966,648
Patented Dec. 27, 1960

2,966,648

ELECTRIC HEATING ELEMENT

Glen H. Morey, Terre Haute, Ind., assignor, by mesne assignments, to Templeton Coal Company, Inc., Terre Haute, Ind., a corporation of Indiana Filed Aug. 26, 1958, Ser. No. 757,431

7 Claims. (Cl. 338—259)

The present invention relates to heating elements.

More particularly, the present invention relates to flexible high-temperature heating elements which are sheathed.

There exist various types of sheathed high-temperature heating elements which can be bent into different shapes. In one known construction, the heating element itself is inserted into a high-temperature metal alloy sheath after which powdered insulating material, such as magnesia, is packed around the heating element to protect it from contact with the sheath. This arrangement, however, possesses certain disadvantages in that the operating temperature is usually limited to about 1400° F. because of the large temperature lag across the firmly packed insulation within the sheath. Moreover, such metal sheathed heating elements are not readily flexible and can be bent only with special tools; even with such tools heating to red or above is sometimes necessary in order to make it possible for the heating element to be bent to the desired shape. Furthermore, in such metal sheathed heaters the heating element itself is, for practical considerations, limited to rather small diameters.

In other types of heating elements an outer sheath of metal is braided over refractory beads or other insulation containing the heating elements. In such constructions the usually closely braided outer metal sheath is stiff so that the flexibility of the heating element is limited. Furthermore, experience has shown that the closely braided outer metal sheath warps considerably when exposed to high temperatures and this limits the operating temperature of the heater. Additionally, the size of the heating element which can be used is limited to small diameters. Finally, the closely braided outer metal sheath is very expensive, thus imposing a very practical limitation to the usefulness of such heating elements.

It is, therefore, an object of the present invention to provide a flexible sheathed high-temperature heating element which overcomes the above disadvantages.

It is another object of the present invention to provide a flexible sheathed heating element which can operate at temperatures substantially higher than existing sheathed heating elements.

It is yet another object of the present invention to provide a sheathed high-temperature heating element which is very flexible and may easily be bent into any desired shape.

The objects of the present invention also include the provision of a flexible sheathed heating device which incorporates a heating element of any desired size.

It is an additional object of the present invention to provide a flexible sheathed high-temperature heating element which may easily be mass-produced at low cost.

It is a further object of the instant invention to provide a sheath for use with a high-temperature heating element which sheath is mechanically strong and also capable of withstanding the high temperature at which the heating element operates.

With the above objects in view, the present invention mainly resides in a flexible sheathed high-temperature heating element which comprises a flexible heating element and flexible sheathing means which encompass the heating element, at least part of the sheathing means being made of insulating material reinforced with wires, more particularly, of fibrous insulating material individual fibers of which are reinforced with wires that are embedded in the respective fibers.

According to one embodiment of the present invention the sheathing means is formed with multiple layers, the outer one being reinforced with wires, whereas the inner layer is free of reinforcing wires so as to prevent contact between the heating element and any wires of the outer layer which protrude from their respective fibers.

Additional objects and advantages of the present invention will become apparent upon consideration of the following description of the accompanying drawing in which:

Fig. 1 is a perspective view of a sheathed heating element according to the present invention;

Fig. 2 is a sectional view, on an enlarged scale, taken on line 2—2 of Fig. 1;

Fig. 3 is a sectional view of a flat sheathed heating ribbon according to the present invention;

Fig. 4 is a fragmentary sectional view of a heating element incorporating a multiple-layer sheath;

Fig. 5 is a fragmentary sectional view of another embodiment of a heating element incorporating a multiple-layer sheath; and Fig. 6 is a fragmentary sectional view of a flat heating ribbon incorporating a multiple-layer sheath.

Referring now to the drawings, and to Figs. 1 and 2 thereof in particular, there is shown a heater 10 which includes a flexible high-temperature heating element 11 which may be in any suitable form, as, for example, in the form of a coil. This coil is encompassed by a flexible sheath 12 made of fibrous insulating material, such as a high-temperature resistant fabric the individual fibers or yarns 13 of which are reinforced with high-temperature metal wires 14 that are embedded in the central portions of the respective fibers. These wires, which are preferably not over 0.015" thick, may be of any suitable corrosion and high-temperature resistant alloy, as, for example, stainless steel, Inconel, Nichrome, or Kanthal, and the fibrous part of the sheath may be of any suitable high-temperature resistant fiber, as, for example, high grade asbestos, quartz, or Fiberfrax, the latter being the trade name for a high-temperature resistant fiber manufactured by the Carborundum Company. The entire sheath may be woven, braided, knitted or otherwise formed directly on to the heating coil 11.

A sixteen-foot length of the above-described heater, incorporating a heating element made of approximately 0.04" diameter wire coiled into a coil of approximately 7⁄16" diameter and approximately ⅛" pitch and a tubular sheath approximately 1⁄16" thick made of asbestos yarn reinforced with Inconel wire approximately 0.004" thick was heated for 24 hours to a temperature of 1800° F. while wrapped about a grounded metal form.

Fig. 3 shows an embodiment of the present invention wherein the heater 20 includes a flexible flat metallic heating ribbon 21 which is encompassed by a sheath 22. As in the above-described embodiment, the individual fibers 23 of the sheath are reinforced with metal wires 24 that are embedded in the respective fibers. This type of heater may be wrapped about pipes so as to heat the same to a very high temperature, whereas a heater incorporating a coil-type heating element could be used in the construction of other heating units.

Fig. 4 shows a heater 30 incorporating a heating coil 31 surrounded by a flexible multiple-layer sheath. The inner layer 32 of the sheath is constituted by a high-temperature resistant fabric the individual fibers of which are indicated at 33, whereas the outer layer 34 is constituted by a high-temperature resistant fibrous material the individual fibers 35 of which are reinforced by wires 36. It will be seen, therefore, that the heater shown in Fig. 4 differs from the previously described heaters in that its sheath includes a layer immediately adjacent the heating element the individual fibers of which layer are free of any reinforcing wires. The purpose of this layer is to prevent contact between the heating element and any of the wires 36 that may protrude from their respective fibers 35. Such a protruding wire is shown at 36a, and it will be seen that but for the provision of the inner sheath 32, this wire 36a would contact the heating coil 31. Thus, by providing a flexible multiple-layer sheath of the type described, one obtains a sheath the outer layer of which is very strong and rugged as well as flexible, whereas accidental contact between the heating coil and any of the reinforcing wires is completely avoided.

Furthermore, a heater of the type shown in Fig. 4 is capable of operating at a very high temperature. By way of illustration, such a heater incorporating a heating element made of approximately 0.04" diameter wire coiled into a coil of approximately 7/16" diameter and approximately 1/8" pitch and encompassed by a sheath having an inner layer made of quartz fabric and an outer layer made of Fiberfrax fibers reinforced with Nichrome V wire 0.004" thick, was tested at a temperature of 2200° F.

Instead of providing separate inner and outer sheaths, such as are shown in the embodiment of Fig. 4, the heating element may be sheathed by a sheath the inner and outer layers of which are integral with each other, i.e., a sheath the fibers of the inner and outer layers of which are woven, braided, knitted or otherwise interlaced with each other at the juncture of the layers. Such an arrangement is shown in Fig. 5 wherein the heater 40 comprises a heating coil 41 encompassed by a sheath 40 having an inner layer 42 the fibers 43 of which are free from reinforcing wires, whereas the fibers 45 of the outer layer 44 are reinforced with embedded wires 46. Such a sheath may be woven, braided, knitted or otherwise formed directly on to the heating coil 41.

Figure 6 shows an embodiment of the present invention wherein the heater 50 includes a flexible flat metallic heating ribbon 51 which is encompassed by an inner sheath 52 of high-temperature resistant fabric the fibers 53 of which are free from reinforcing wires and an outer sheath 54 of high-temperature resistant fabric the individual fibers 55 of which are reinforced with wires 56.

If desired, the inner and outer sheaths 52, 54 may be integral with each other, as in the embodiment shown in Figure 5, i.e., the sheath may be in the form of a single tubular envelope the inner layer of which is free from reinforcing wires and the fibers of the outer layer of which are reinforced with wires.

From the foregoing it will be understood that the sheathing is essentially a fabric or textile material consisting of threads or yarns interlaced either by braiding, knitting or weaving the material of the sheath. The sheath may consist of a single textile or fabric layer of this nature or an inner-sheath with one or more other sheaths superimposed thereon which may be interwoven therewith.

In forming the heating coil, resistance wire of the desired size may be wound up on a mandrel similar to the manner in which springs are formed, and thereafter a predetermined length of the wound up wire can be taken and stretched to the desired overall length. In this manner substantially any ratio of length to watts can be provided to meet varying situations.

A particular advantageous feature of the coil type heating element is that it is fully flexible in all directions and thus can be wound about in any path to fit it to an object of irregular configuration, or in order to provide for any particular distribution of the heat energy that may be required. With the kettle, it may be desired to supply more heat to the bottom than to the sides, and the sheathed heating coil of the present invention can readily be applied to the article by wrapping it in a spiral of increasing pitch from the bottom of the kettle upwardly.

Similarly, large heating blankets can be manufactured by laying the heating coil on a supporting member such as wire reinforced fabric, in a zig-zag pattern. The resulting heating blanket will be flexible and the distribution of the energy supplied thereto can be varied according to any pattern.

It will be understood that the present invention is susceptible to modifications in order to adapt it to different usages and conditions, and it is, therefore, desired to comprehend such modifications within this invention as may fall within the scope of the appended claims.

What I claim is:

1. An article of manufacture comprising, in combination, an elongated flexible flat high-temperature heating ribbon; and tubular flexible sheating means encompassing said heating ribbon, said sheating means comprising a textile material formed of yarns made of high-temperature resistant fibrous insulating material, at least some of said yarns being individually reinforced with fine high temperature resistant wires that are embedded in the central portions thereof.

2. An article of manufacture comprising, in combination, a flexible heating element; and flexible multiple-layer sheathing means encompassing said heating element, said sheathing means having an outer textile layer of insulating material, high temperature resistant wires embedded in and reinforcing the individual fibers of the outer layer, and an inner textile layer solely of insulating material for preventing contact between said heating element and the wires of said outer layer.

3. An article of manufacture comprising, in combination, a flexible high-temperature heating element; and a flexible multiple-layer sheath encompassing said heating element, said sheath having an outer textile layer of high-temperature resistant fibrous insulating material the fibers of which are reinforced with wires that are embedded in the respective individual fibers and an inner textile layer of high-temperature resistant fibrous insulating material free from reinforcing wires for preventing contact between said heating element and any wires of said outer layer which protrude from their respective fibers, the fibers of said inner and outer layers being interlaced with each other at the juncture of said layers.

4. A high temperature heating element comprising, in combination, an elongated flexible high-temperature heating coil; and flexible multiple-layer tubular sheathing means encompassing said heating coil, said sheathing means having an outer textile layer of high-temperature resistant fibrous insulating material the individual fibers of which are reinforced with wires that are embedded in the respective fibers and an inner layer of high-temperature resistant insulating fabric free from reinforcing wires for preventing contact between said heating coil and any wires of said outer layer which protrude from their respective fibers.

5. A high temperature heating element comprising, in combination, an elongated flexible flat high-temperature heating ribbon; and flexible multiple-layer sheathing means encompassing said heating ribbon, said sheathing means having an outer layer of high-temperature resistant fibrous insulating material the individual fibers of which are reinforced with wires that are embedded in the respective fibers and an inner layer of high-temperature resistant insulating fabric free from reinforcing wires for preventing contact between said heating ribbon and any wires of said outer layer which protrude from their respective fibers.

6. For use with a flexible high-temperature heating element, a flexible multiple-layer sheath comprising outer sheathing means of high-temperature resistant fibrous insulating material reinforced with wires that are embedded in the respective individual fibers and inner sheathing means of high-temperature resistant insulating fabric free from reinforcing wires, whereby contact between any wires of said outer sheathing means which protrude from their respective fibers and a heating element arranged interiorly of said inner sheathing means is prevented.

7. An article of manufacture comprising, in combination, an elongated flexible high-temperature heating element; and tubular flexible sheathing means encompassing said heating element, said sheathing means comprising a textile material formed of yarns made of high-temperature resistant fibrous insulating material, at least some of said yarns being individually reinforced with fine high-temperature resistant wires that are embedded in the central portion thereof.

References Cited in the file of this patent

UNITED STATES PATENTS

| | | |
|---|---|---|
| 2,240,358 | Walters | Apr. 29, 1941 |
| 2,258,237 | Brockius | Oct. 7, 1941 |
| 2,586,345 | King | Feb. 19, 1952 |
| 2,690,984 | Crandall et al. | Oct. 5, 1954 |
| 2,716,187 | Veneklasen et al. | Aug. 23, 1955 |
| 2,725,713 | Blanchard | Dec. 6, 1955 |
| 2,810,669 | Heupgen | Oct. 22, 1957 |

FOREIGN PATENTS

| | | |
|---|---|---|
| 279,523 | Great Britain | Oct. 20, 1927 |
| 893,159 | France | Jan. 24, 1944 |
| 923,852 | France | Feb. 24, 1947 |